(12) United States Patent
Clark et al.

(10) Patent No.: US 7,370,884 B2
(45) Date of Patent: May 13, 2008

(54) EXPANDING AIRBAG INFLATOR HOUSING

(75) Inventors: Marcus T. Clark, Kaysville, UT (US);
Steven L. Olsen, Ogden, UT (US);
Nyle K. Longhurst, Layton, UT (US);
Mark L. King, Ogden, UT (US);
Patricia A. Welsh, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 418 days.

(21) Appl. No.: 10/791,399

(22) Filed: Mar. 2, 2004

(65) Prior Publication Data

US 2005/0194771 A1    Sep. 8, 2005

(51) Int. Cl.
*B60R 21/26* (2006.01)
(52) U.S. Cl. ............... 280/740; 280/736; 280/728.2
(58) Field of Classification Search ........... 280/740, 280/742, 736, 728.2, 730.2
See application file for complete search history.

(56) References Cited

U.S. PATENT DOCUMENTS

| 4,068,862 | A |   | 1/1978  | Ishi et al. |
|-----------|---|---|---------|-------------|
| 4,414,902 | A |   | 11/1983 | Strasser et al. |
| 4,944,527 | A |   | 7/1990  | Bishop et al. |
| 5,141,247 | A | * | 8/1992  | Barth ................ 280/728.2 |
| 5,149,130 | A | * | 9/1992  | Wooley et al. ........ 280/743.1 |
| 5,172,933 | A |   | 12/1992 | Strasser |
| 5,340,147 | A |   | 8/1994  | Fontecchio et al. |
| 5,498,029 | A | * | 3/1996  | Mossi et al. ............ 280/741 |
| 5,547,213 | A | * | 8/1996  | Lang et al. ............ 280/728.2 |
| 5,611,563 | A | * | 3/1997  | Olson et al. ........... 280/728.2 |
| 5,613,700 | A | * | 3/1997  | Hiramitsu et al. ...... 280/728.2 |
| 5,918,898 | A |   | 7/1999  | Wallner et al. |
| 6,161,865 | A | * | 12/2000 | Rose et al. ............ 280/728.3 |
| 6,231,069 | B1 |  | 5/2001  | Yokoyama |
| 6,336,659 | B1 |  | 1/2002  | Corrion |
| 6,406,056 | B2 | * | 6/2002  | Yokota ................ 280/728.2 |
| 6,419,266 | B1 |  | 7/2002  | Morfouace et al. |
| 6,467,805 | B1 |  | 10/2002 | Schnöwitz et al. |
| 6,616,176 | B2 | * | 9/2003  | Uchiyama et al. ....... 280/728.3 |
| 2003/0094799 | A1 | | 5/2003 | Smith |
| 2003/0132615 | A1 | * | 7/2003 | Henderson ............ 280/728.3 |

FOREIGN PATENT DOCUMENTS

DE    101 39 768 A1    2/2002
JP    2000-211465      8/2000

OTHER PUBLICATIONS

Anonymous, Deformable Diffuser for an Air Bag Module, research Disclosure, Kenneth Mason Publications, Westbourne, GB, vol. 391, No. 1, Nov. 1996, XP007121366, pp. 1-4.

* cited by examiner

*Primary Examiner*—Ruth Ilan
*Assistant Examiner*—Leonard McCreary, Jr.
(74) *Attorney, Agent, or Firm*—Sally J Brown; Madson & Austin (57) ABSTRACT

An airbag inflator diffusion system having a thin profile. The diffusion system includes an airbag inflator that is inserted into a sleeve. The sleeve has overlapping longitudinal edges positioned so that the sleeve tightly circumscribes the inflator. Engagement tabs are formed in one longitudinal edge of the sleeve and fold through perforations formed adjacent the other longitudinal edge. Upon activation of the inflator, the sleeve expands radially forming an exhaust passage through which exhaust gas may travel. The folded engagement tabs and their corresponding perforations limit the radial expansion of the sleeve.

29 Claims, 5 Drawing Sheets

EXPANDING AIRBAG INFLATOR HOUSING

BACKGROUND OF THE INVENTION

1. Field of the Invention

The present invention relates to airbag inflation systems for use in motor vehicles. More specifically, the present invention relates to airbag inflator housings for diffusing inflation gas exiting an airbag inflator.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is designed to produce a gas to rapidly inflate the cushion when needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and pressurized gas, to produce a volume of an inflation gas. The inflation gas is channeled into the airbag, rapidly inflating it. Inflation of the airbag causes it to deploy, placing it in position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

Airbag apparatuses have been primarily designed for deployment in front of an occupant: between the upper torso and head of an occupant and the windshield or instrument panel. Side impact airbags such as inflatable curtains and seat mounted airbags also have been developed in response to the need for protection from impacts in a lateral direction, or against the side of the vehicle. Other airbags such as knee bolsters and overhead airbags also operate to protect various parts of the body from collision.

Generally, the inflator is installed within or in close proximity to the textile airbag. However, doing so requires the inflator to be housed in a diffuser. When activated, the inflator generates inflation gas which escapes exit ports in the inflator at a high velocity and temperature. Due to limited space, the uninflated textile bag is often folded up against the inflator. Without a diffuser, the hot gas is concentrated on the textile bag. The concentrated hot gas and the confined space may combine to cause the gas to burn one or more holes in the textile bag. The holes may cause the airbag to inflate improperly.

A diffuser housing disperses the inflation gas, allowing them to expand and cool. Heat may be transferred from the inflation gas to the surface of the diffuser. A diffuser may also be used to direct the gas leaving the exit ports. However, in order for the inflator to perform properly, a flow area around the inflator is needed to enable inflation gas to exit the inflator without excessive restriction. The needed flow area is achieved through the existence of an exhaust passage. Exhaust passages are typically a space between the inflator and the diffuser housing. Gas may be directed through the exhaust passage to cause the airbag to inflate in a particular manner. Once the gas passes through the diffuser, the gas is sufficiently cooled and/or not concentrated to prevent burning holes in the textile airbag.

For example, in a side impact airbag module, an inflator is typically press-fitted inside a steel housing with pre-installed mounting studs extending therefrom. The inflator housing and side airbag are then ordinarily enclosed in a plastic case having two sides that snap together. The resulting module is a thin rectangular or alternatively-shaped module enclosing the inflator, inflator housing, and side impact airbag.

In order for the inflator to perform properly, an exhaust passage must exist between the housing and the inflator to provide a flow area for inflation gas to exit the inflator. An exhaust passage is typically created by press-fitting the inflator against pre-formed inwardly directed dimples in the steel housing. A press fit is an interference force fit accomplished using a press. A heavy press fit, where the inflator is tightly pressed into the steel housing, is often necessary to prevent axial movement of the inflator within the housing. The axial direction is parallel to the longitudinal length of the inflator. The inflator is thereby in contact with the inwardly directed dimples while the remaining surface of the steel housing is spaced apart from the inflator a short distance. The space between the inflator and the steel housing comprises the exhaust passage. However, the existence of the exhaust passage widens the profile of the inflator housing in a direction orthogonal to the direction the mounting studs project. The side impact airbag module may consequently protrude out of the side of the seat when installed.

Exhaust passages typically occupy valuable space when the diffuser and inflator are installed and not in use. Uninflated airbag modules are installed in a very limited space in a steering wheel, dashboard, interior compartment, seat back, roof rail, roof compartment, or other space in a vehicle. Consequently, the minimization of the space occupied by the exhaust passages may provide an aesthetically pleasing installation area and give vehicle manufacturers more flexibility in designing the installation area.

Accordingly, a need exists for an airbag diffusion system which cools the inflation gas exiting the inflator to prevent holes from being burned in the airbag material. A need further exists for the airbag diffusion system to be compact and have a thin profile to allow the system to be installed in areas of small dimensions relative to conventional diffusion systems. A need also exists for a diffusion system to be simple and inexpensive to fabricate. Such an apparatus is disclosed herein.

BRIEF SUMMARY OF THE INVENTION

The apparatus of the present invention has been developed in response to the present state of the art, and in particular, in response to the problems and needs in the art that have not yet been fully solved by currently available inflator diffusion systems. Thus, the present invention provides an airbag diffuser system that is simple to fabricate and may be installed in a smaller space within a vehicle than conventional inflator systems.

In accordance with the invention as embodied and broadly described herein in the preferred embodiment, an airbag diffusion system is provided. According to one embodiment, the airbag diffusion system may comprise an airbag inflator and an inflator diffuser housing designed to encase the inflator in a tight press fit. The diffuser housing diffuses exhaust gas leaving the inflator so the airbag does not become damaged through direct impingement of hot exhaust gas.

The diffuser housing includes a sleeve shaped to longitudinally receive the inflator. The sleeve may be constructed of sheet metal and fabricated through a stamping process. The diffuser housing also includes crimping tabs and mounting studs. The crimping tabs are for crimping around the inflator to prevent axial movement of the inflator once inserted within the sleeve. The mounting studs project orthogonally from the sleeve for mounting the diffuser housing to a specific location within the vehicle.

The sleeve has a first longitudinal edge that overlaps a second longitudinal edge. A series of perforations are formed adjacent the first longitudinal edge. Engagement tabs project from the second longitudinal edge on the opposite side of the sleeve from each perforation. When the first longitudinal edge overlaps the second longitudinal edge, each engagement tab protrudes through its corresponding perforation from underneath the sleeve adjacent the first longitudinal edge.

Each engagement tab is then folded back over above the perforation to form a hook-like structure, thereby slidably engaging the first and second longitudinal edges. A crease is formed in the engagement tab when it is folded over. The crease is placed abutting or in close proximity to an inward edge of the perforation. Consequently, the folded engagement tab covers its corresponding perforation.

The sleeve in this configuration has a cross-sectional shape and diameter similar to that of the airbag inflator. The inflator is press fitted longitudinally into the diffuser housing, such that exit ports on the inflator are positioned underneath a solid section of the diffuser housing between perforations. When the inflator is activated, exhaust gas exits the exit ports and impinges against the solid section of the sleeve. The force of the exhaust gas causes the sleeve to expand radially, creating an exhaust passage and cooling the exhaust gas. Radial expansion occurs when the first longitudinal edge slides laterally with respect to the second longitudinal edge under the force of impinging exhaust gas.

Radial expansion of the sleeve continues until the crease of the folded engagement tab moves from abutting the inward edge of the perforation to engagement with the outward edge of the perforation. The perforation becomes exposed allowing exhaust gas to exit there through.

The engagement tab thus engaged with the perforation acts as a structural stop to prevent continued expansion of the sleeve.

Consequently, the diffuser housing of the present invention has a thin profile compared to conventional airbag diffusion systems because it tightly circumscribes the airbag inflator when the inflator is not in use. These and other features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

For this application, the phrases "connected to" and "coupled to" refer to any form of interaction between two or more entities, including mechanical, electrical, magnetic, electromagnetic, fluid, and thermal interaction. The phrase "attached to" refers to a form of mechanical coupling that restricts relative translation or rotation between the attached objects. The term "abut" or "abutting" refers to items that are in direct physical contact with each other, although the items may not necessarily be attached together. The phrase "integrally formed" refers to a body that is manufactured integrally, i.e., as a single piece, without requiring the assembly of multiple pieces. Multiple parts may be integrally formed with each other if they are formed from a single workpiece.

Figure 1:
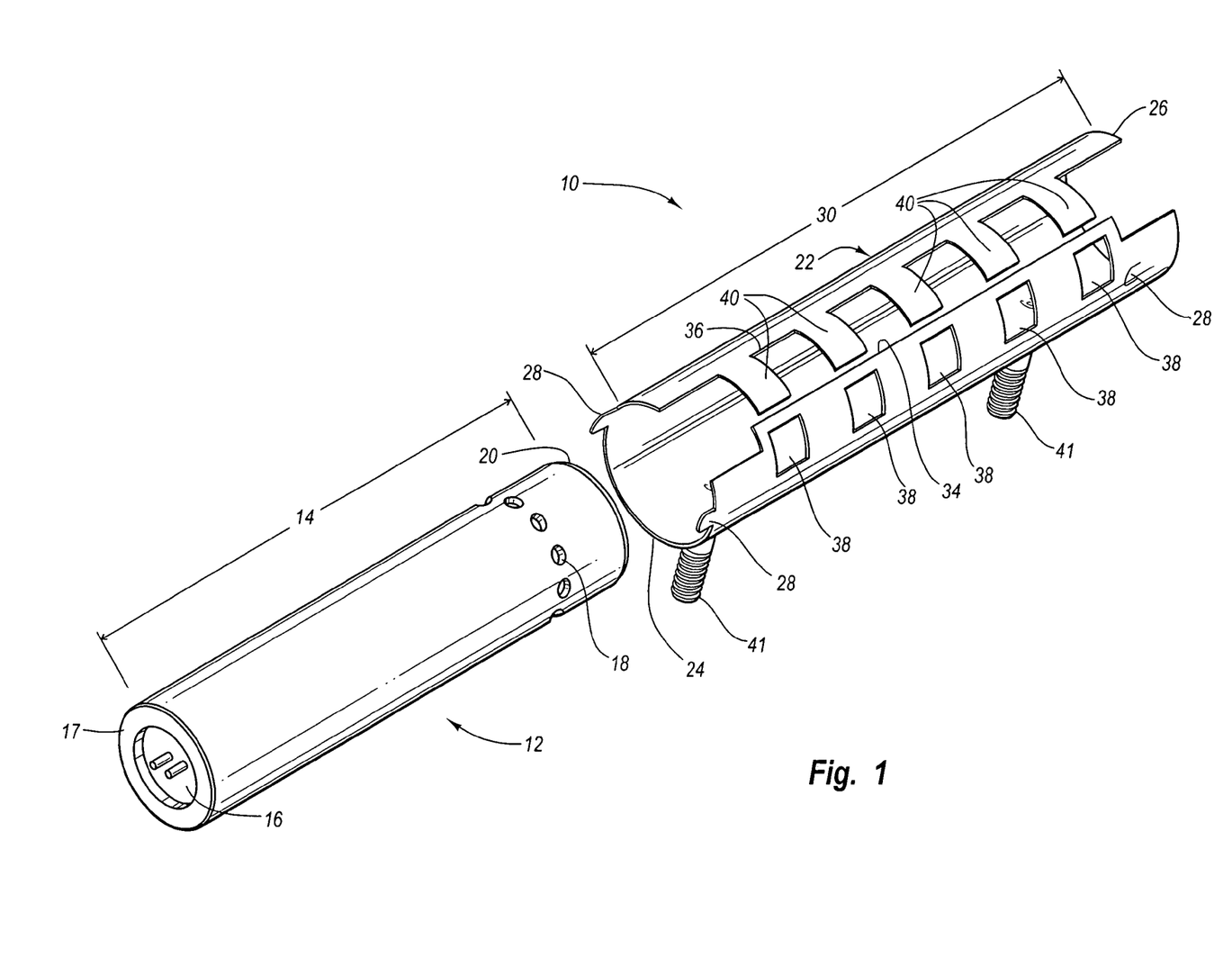
FIG. 1 is an exploded perspective view of one embodiment of the inflator diffuser housing of the present invention and an airbag inflator.

Referring to FIG. 1, an inflator diffuser housing 10 of the present invention is depicted from an exploded perspective view before being fully assembled. The inflator diffuser housing 10 is designed to encase an elongate airbag inflator 12, but alternative embodiments of the present invention can house various types of inflators. An elongate airbag inflator 12 is an inflator that has a longitudinal length 14 greater than its width or height. The longitudinal length 14 of the inflator 12 is the distance covered by the inflator 12 along its greatest dimension.

The inflator 12 is used to generate inflation gas to rapidly inflate an airbag (not shown). The airbag inflator 12 is a pyrotechnic device that may use the combustion of gas-generating material to generate inflation gas. Alternatively, the inflator 12 contains a stored quantity of pressurized inflation gas, or a combination of pressurized inflation gas and ignitable material for heating the inflation gas.

The inflator 12 has a squib 16 at a proximal end 17 of the inflator 12. A signal from an electronic control unit (not shown) is sent via wiring to the inflator squib 16. The electrical signal causes the inflator 12 to activate generating exhaust gas. The exhaust gas is forced to leave the inflator 12 through exit ports 18. The exit ports 18 may be located adjacent the distal end 20 of the inflator 12 or, alternatively, on some other location on the inflator 12. Typically, exhaust gas leaving the exit ports 18 is under high pressure as it travels out of the exit ports 18.

Referring still to FIG. 1, the inflator diffuser housing 10 is used to diffuse exhaust gas leaving the inflator 12. The diffuser housing includes a sleeve 22. The sleeve 22 may be constructed of stamped sheet metal having a thickness of approximately 0.030". The sheet metal plate is rolled into a sleeve 22 that is substantially cylindrical and tubular in shape. The sleeve 22 is shaped to longitudinally receive the inflator 12. Accordingly, the sleeve 22 has substantially the same cross-sectional shape as the inflator 12.

The diffuser housing 10 has a proximal end 24 and a distal end 26. Crimping tabs 28 may be located adjacent both the proximal 24 and distal ends 26 for crimping around the inflator 12 once installed within the sleeve 22. In the diffuser housing 10 illustrated in FIG. 1 crimping tabs 28 extend from the proximal end 24 of the diffuser housing 10 and are folded inward, toward each other after the inflator 12 has been press fitted inside the diffuser housing 10.

Crimping tabs 28 also exist adjacent the distal end 26 of the diffuser housing 10 as cutouts in the sleeve 22. The crimping tabs 28 adjacent the distal end 26 can also be folded inward, toward the center of the sleeve 22 previous to, or after insertion of the inflator 12 depending on how the cutouts are oriented. The crimping tabs 28 prevent axial movement of the inflator 12 within the diffuser housing 10, particularly when the inflator 12 is activated. The axial direction is parallel with the longitudinal length 14 of the inflator 12 and the longitudinal length 30 of the diffuser housing 10. Alternatively, instead of crimping tabs 28, the proximal and distal ends 24, 26 of the diffuser housing 10 may be crimped down around the inflator 12 after it has been inserted into the sleeve 22.

The sleeve 22 has a first longitudinal edge 34 and a second longitudinal edge 36. The longitudinal edges 34, 36 are the edges of the sleeve 22 along its longitudinal length 30. A series of perforations 38 are created in the sleeve 22 adjacent and alongside the first longitudinal edge 34. The perforations 38 may be rectangular cutouts that are formed in the sheet metal during the stamping process used to manufacture the sleeve 22.

Engagement tabs 40 are integrally formed in the second longitudinal edge 36 of the sleeve 22. The engagement tabs 40 project from the second longitudinal edge 36 away from each perforation 38 and away from the first longitudinal edge 34. Typically, the number of engagement tabs 40 on the second longitudinal edge 36 corresponds to the number of perforations 38 in the first longitudinal edge 34. Accordingly, each engagement tab 40 is located directly opposite each perforation 38. Alternatively, separately attachable tabs or pre-formed hooks may be used in place of the integrally formed engagement tabs 40 along the second longitudinal edge 34. As will be discussed below, the engagement tabs 40 may be folded over and formed into hooks when the diffuser housing 10 is fully assembled.

Projecting orthogonally from the sleeve 22 of the diffuser housing 10 are two mounting studs 41. The mounting studs 41 are used to fasten the diffuser housing 10 to a specific location within a motor vehicle, such as a vehicle seat back. The mounting studs 41 are attached to the sleeve 22. Alternatively, the mounting studs 41 are attached to the inflator 12, and the sleeve 22 would have corresponding orifices to receive the mounting studs 41.

To assemble the diffuser housing 10, the first longitudinal edge 34 is placed overlapping the second longitudinal edge 36 so that the sleeve 22 forms a substantially tubular shape. Each engagement tab 40 protrudes through its corresponding perforation 38 from underneath the sleeve 22 adjacent the first longitudinal edge 34. Each engagement tab 40 is then folded over on itself above the first longitudinal edge 34 to form a hook-like or similar structure. The first longitudinal edge 34 is thereby engaged with the second longitudinal edge 36. Once engaged, the first longitudinal edge 34 can slide with respect to the second longitudinal edge 36, making the longitudinal edges 34, 36 slidably engaged.

The combination of the tabs 40 being engaged with the perforations 38 creates a structural stop that limits the ability of the longitudinal edges 34, 36 to become disengaged and no longer overlap each other. The structural stop is one structure of the diffuser housing 10 that abuts another structure to prevent relative movement of the two structures in at least one direction.

The sleeve 22 that is formed has a cross-sectional shape substantially the same as the cross-sectional shape of the inflator 12. The cross-sectional diameter of the sleeve 22 may also be substantially the same as the cross-sectional diameter of the inflator 12. Consequently, the inflator 12 must be press-fitted inside the sleeve 22.

Upon activation of the inflator 12, the sleeve 22 expands radially creating an exhaust passage (not shown). The radial expansion of the sleeve 22 occurs under the force of impinging exhaust gas where the first longitudinal edge 34 slides laterally with respect to the second longitudinal edge 36 until the engagement tabs 40 and the edge of the perforations 38 contact in the form of a structural stop. The structural stop limits the sleeve 22 from continuing to expand radially.

Figure 2A:
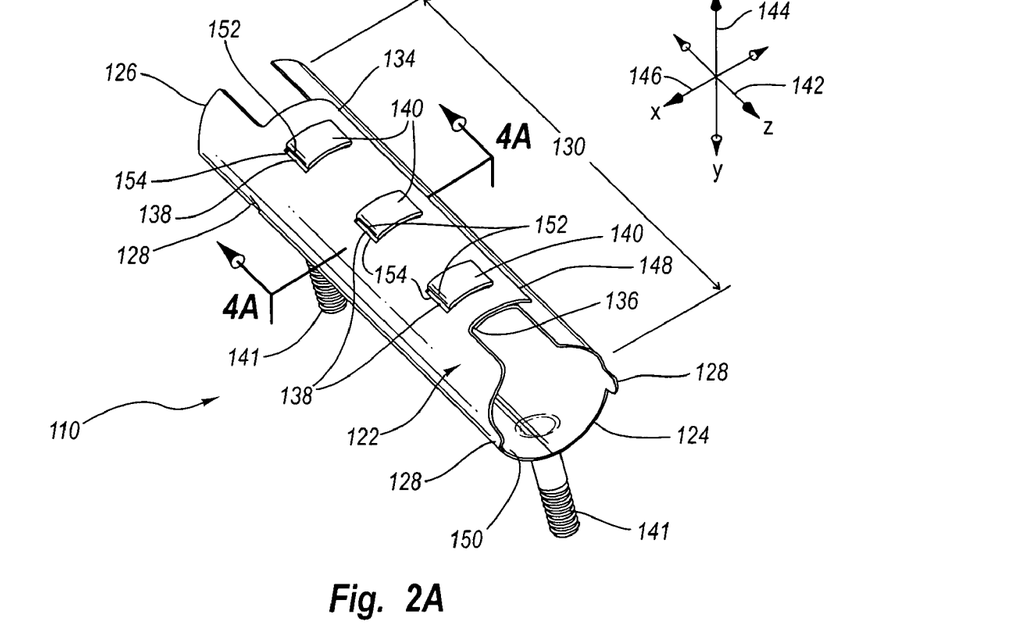
FIG. 2A is a perspective view of another embodiment of the inflator diffuser housing absent an airbag inflator.

Referring to FIG. 2A, an alternative embodiment of the inflator diffuser housing 110 of the present invention is depicted from a perspective view. The diffuser housing 110 is shown absent the airbag inflator after engagement tabs 140 have been folded through perforations 138 as described in conjunction with the embodiment illustrated and described in accordance with FIG. 1. For the sake of illustration, the diffuser housing 110 is oriented such that its longitudinal length 130 is parallel to a z-axis 142. The diffuser housing 110 has mounting studs 141 extending orthogonally from the sleeve 122 in a direction parallel to a y-axis 144. An x-axis 146 thereby exists in a direction perpendicular to both the z-axis 142 and the y-axis 144 defining the direction containing the width of the diffuser housing 110.

The diffuser housing 110 includes a sleeve 122 constructed of a single sheet of material having a first longitudinal edge 134 that overlaps a second longitudinal edge 136. A seam 148 is thereby formed along the length 130 of the sleeve 122 in a direction parallel to the z-axis 142. Perforations 138 exist adjacent the first longitudinal edge 134 as similarly described in conjunction with FIG. 1. Engagement tabs 140 project from the second longitudinal edge 136 and have a similar structure as disclosed in conjunction with the engagement tabs of FIG. 1.

The engagement tabs 140 protrude through the perforations 138 from underneath the first longitudinal edge 134 to above a sleeve wall 150. The engagement tabs 140 are then folded back over the perforations 138 toward the seam 148. The engagement tabs 140 are consequently formed into a hook-like structure that acts as part of the structural stop to limit radial expansion of the sleeve 122. Alternatively, the engagement tabs 140 are folded at a 90° angle or some other angle to form the structural stop.

When forming the engagement tabs 140 into a component of the structural stop, care must be taken to ensure that no sharp edges from the engagement tabs 140 come into contact with the airbag (not shown). The airbag may be damaged and not perform properly if it contacts any sharp edges from the engagement tabs 140. Alternatively, the problem of contacting sharp edges of the engagement tabs 140 could be solved by using alternative methods of airbag attachment. Another alternative would be to use pre-formed integral or separately attachable hooks on the second longitudinal edge 136 for engagement with the perforations 138.

In an alternative embodiment, the second longitudinal edge 136 overlaps the first longitudinal edge 134. The engagement tabs 140 would then be folded down through the perforations 138, underneath the sleeve wall 150. The engagement tabs 140 would also be folded back upon themselves toward the first longitudinal edge 134. Although providing for an effective structural stop, having the engagement tabs 140 extend to an interior of the sleeve 122 may make press-fitting the inflator (not shown) into the sleeve 122 more difficult.

As depicted in FIG. 2A, the engagement tabs 140 are folded from underneath the first longitudinal edge 134 to the exterior of the sleeve 122. Each folded engagement tab 140 has a crease 152 positioned to abut. or be in proximity to an inward edge 154 of each corresponding perforation 138. The perforations 138 are thereby covered by the second longitudinal edge 136 of the sleeve 122. The engagement tabs 140 and perforations 138 so located would provide for a tight press fit for an inflator (not shown).

Referring still to FIG. 2A, crimping tabs 128 also exist in the sleeve 122 for crimping down around the ends of an inflator after it has been inserted into the sleeve 122. The crimping tabs 128 prevent the inflator from ejecting out of the diffuser housing 110 in the direction of the z-axis 142 after activation.

The crimping tabs 128 of the diffuser housing 110 extend away from a proximal end 124 of the housing 10 in the direction of the z-axis 142 when the inflator has not yet been inserted. This is so the crimping tabs 128 do not interfere with press-fitting the inflator inside the sleeve 122. After the inflator has been inserted into the diffuser housing 110 the crimping tabs 128 that extend from the proximal end 124 are folded in toward one another in the direction of the x-axis 146.

However, the crimping tabs 128 near a distal end 126 of the housing 110 are crimped or folded inward toward each other in the direction of the x-axis 146 previous to insertion of the inflator. The crimping tabs 128 so oriented abut the inflator adjacent the distal end 126 when the inflator is inserted within the sleeve 122. The crimping tabs 128 adjacent the distal end 126 thereby limit the distance the inflator can be inserted into the sleeve 122 along its longitudinal length 130.

Figure 2B:
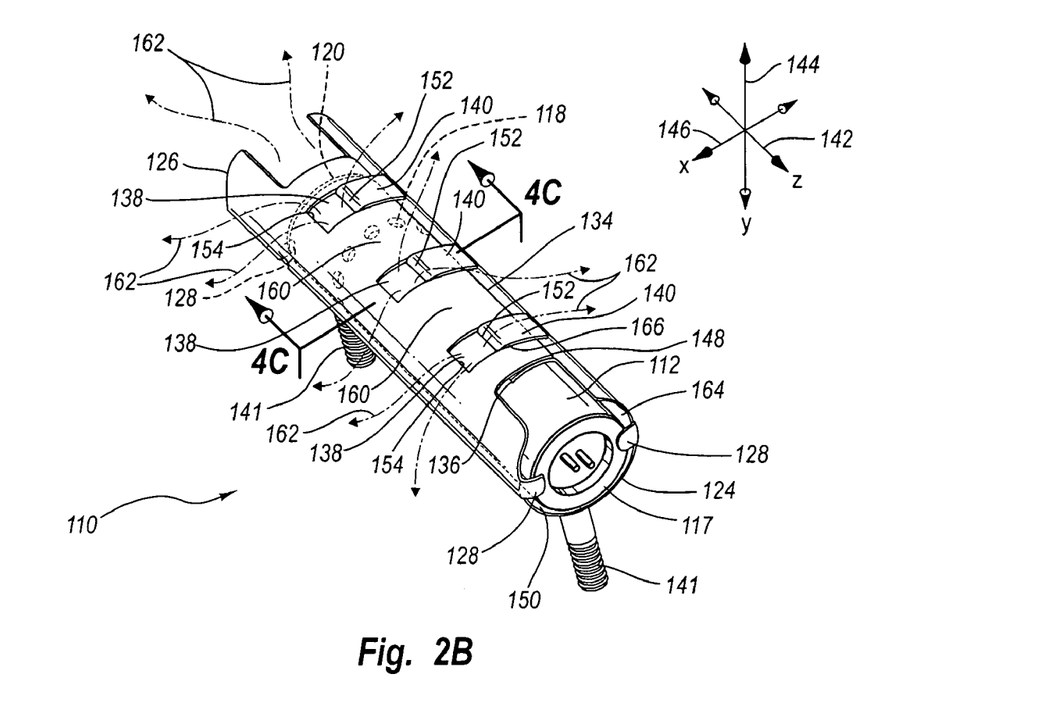
FIG. 2B is a perspective view of the inflator diffuser housing of FIG. 2A encasing an airbag inflator, depicted after activation of the inflator and expansion of the housing.

Referring to FIG. 2B, the inflator diffuser housing 110 of FIG. 2A is depicted from a perspective view encasing an airbag inflator 112 after the inflator 112 has been activated. The crimping tabs 128 are shown crimped down on both the proximal and distal ends 117, 120 of the inflator 112. This prevents axial movement of the inflator 112 within the diffuser housing 110 upon activation. Axial movement of the inflator 112 would be movement in the direction of the z-axis 142.

The inflator 112 is placed within the sleeve 122 such that exit ports 118 are located between perforations 138, where the diffuser housing 110 has a solid section 160. The solid sections 160 of the diffuser housing 110 cover the exit ports 118, while the perforations 138 do not cover any exit ports 118. This way of positioning the inflator 112 within the sleeve 122 prevents hot exhaust gas (graphically illustrated by arrows 162) from directly impinging the airbag (not shown) and possibly burning a hole therein.

The solid section 160 of the sleeve 122 receives direct impingement of exhaust gas 162 from the exit ports 118. The solid section 160 serves as a cooling mechanism for the hot exhaust gas 162 leaving the inflator 112. The exhaust gas 162 is cooled by transferring heat to the solid section 160 of the sleeve 122.

The exhaust gas 162 leaves the exit ports 118 in a direction perpendicular to the inflator 112. The exiting exhaust gas 162 impinges on one or more solid sections 160 of the diffuser housing 110. The exhaust gas 162 exerts a force against the solid section 160 causing the sleeve 122 to expand radially. Radial expansion is expansion of the sleeve 122 in a direction within a plane created by the x-axis 146 and y-axis 144. The seam 148 allows the first longitudinal edge 134 to move laterally with respect to the second longitudinal edge 136. The diameter of the sleeve 122 is thereby increased, forming an exhaust passage 164 between the inflator 112 and the sleeve wall 150.

As the sleeve 122 expands, the engagement tabs 140 slide the length of the perforations 138 so that the crease 152 created in each engagement tab 140 moves from abutting the inward edge 154 of the perforation 138 to engaging the outward edge 166 of the perforation 138. Before expansion, the exterior of the crease 152 abuts the inward edge 154 of the perforation 138. After expansion, the interior of the crease 152 abuts the outward edge 166 of the perforation 138.

Once in contact with the outward edge 166 of the perforation 138, the sleeve 122 can no longer expand radially because each engagement tab's 140 engagement with its corresponding perforation 138 comprises a structural stop. Consequently, the sleeve 122 can expand a distance equivalent to the length of the perforations 138. The diameter of the diffuser housing 110 also varies approximately the length of the perforations 138. As a result of sleeve 122 expansion the perforations 138 become exposed.

The solid section 160 of the sleeve 122 directs the exhaust gas 162 flowing from the exit ports 118 towards the newly formed exhaust passage 164. As mentioned above, the exhaust gas 162 is cooled when contacted with the solid section 160 of the sleeve 122. Dispersion of the exhaust gas 162 also causes the gas to cool as it expands and transfers its heat to air within the exhaust passage 164. The exhaust gas 162 travels through the exhaust passage 164 towards the recently exposed perforations 138 or towards the distal or proximal ends 126, 124 of the diffuser housing 110. The exposed perforations 138 allow exhaust gas 162 to escape the diffuser housing 110 into an area external to the diffuser housing 110, namely the airbag. As the exhaust gas 162 passes through the perforations 138, the gas is further dispersed which causes it to further cool.

Figure 3:
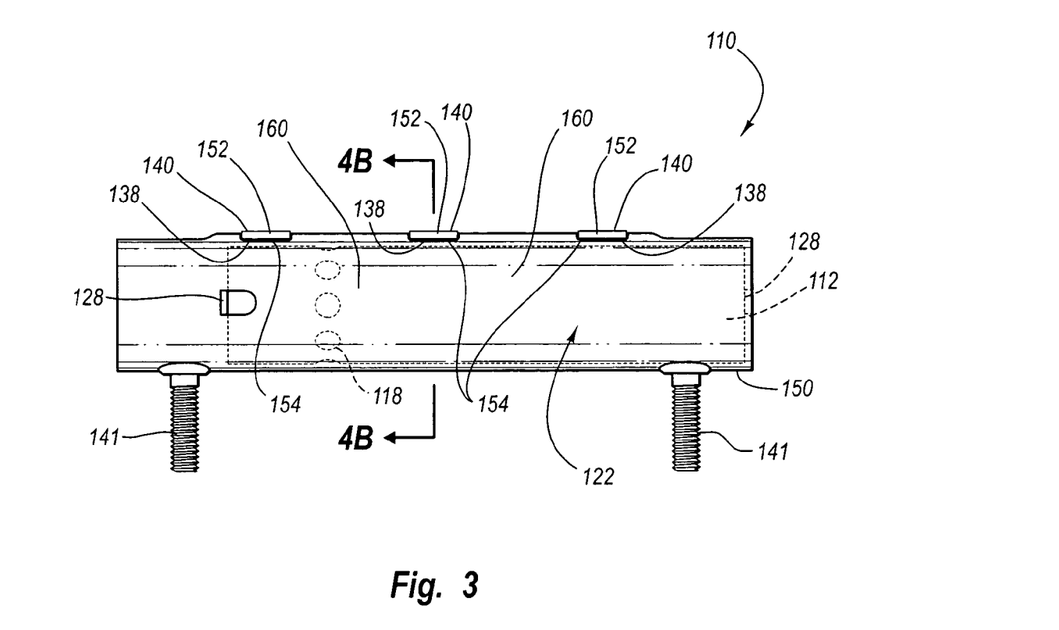
FIG. 3 is a side view of the inflator diffuser housing of FIG. 2A encasing an airbag inflator illustrated in phantom.

Referring to FIG. 3, the inflator diffuser housing 110 of FIG. 2A is illustrated from a side elevation view encasing the airbag inflator 112. The inflator 112 is illustrated in phantom. The inflator 112 has been press-fitted inside the sleeve 122 of the diffuser housing 110 such that little to no space exists between the outside surface of the inflator 112 and the sleeve wall 150. When the diffuser housing 110 tightly circumscribes the inflator 112, the crease 152 of each engagement tab 140 abuts the inward edge 154 of each perforation 138.

The inflator 112 is positioned longitudinally into the sleeve 122 so that the exit ports 118 are positioned underneath the solid section 160 of the sleeve 122 between perforations 138. Exhaust gas (not shown) may exit the exit ports 118 and impinge against the solid section 160 and expand the sleeve 122 radially to form an exhaust passage (not shown). The crimping tabs 128 are shown crimped down around the inflator 112 preventing axial movement of the inflator 112 when activated.

Figure 4A:
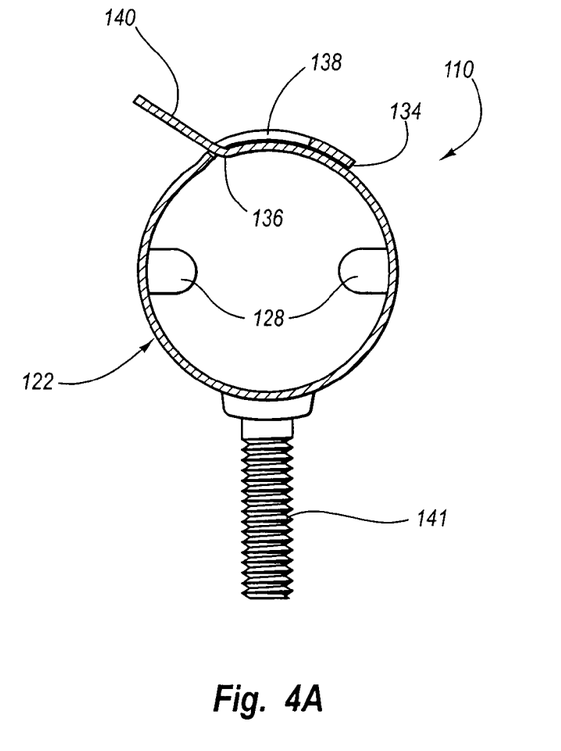
FIG. 4A is a front cross-sectional view of the inflator diffuser housing taken from the plane 4A-4A of FIG. 2A before folding over an engagement tab, the inflator diffuser housing illustrated absent the airbag inflator.

Referring to FIG. 4A, the diffuser housing 110 is viewed from a front cross-sectional view along the plane 4A-4A in FIG. 2A absent an airbag inflator. However, the diffuser housing 110 depicted in FIG. 4A is illustrated before folding over the engagement tab 140. According to the embodiment depicted, the diffuser housing 110 has a sleeve 122 with first and second longitudinal edges 134, 136. The diffuser housing 110 also has crimping tabs 128, and mounting studs 141 extending orthogonally from the sleeve 122.

Adjacent the first longitudinal edge 134 of the sleeve 122 are several perforations 138. The second longitudinal edge 136 of the sleeve 122 has engagement tabs 140 integrally formed therein. In assembling the diffuser housing 110, the first longitudinal edge 134 is placed overlapping the second longitudinal edge 136 giving the sleeve 122 a substantially tubular shape. The engagement tab 140 protrudes through its corresponding perforation 138 from underneath the sleeve 122. In an alternative embodiment, the second longitudinal edge 136 overlaps the first longitudinal edge 134 so that the engagement tab 140 protrudes through the perforation 138 from the exterior of the sleeve 122 towards the interior.

Figure 4B:
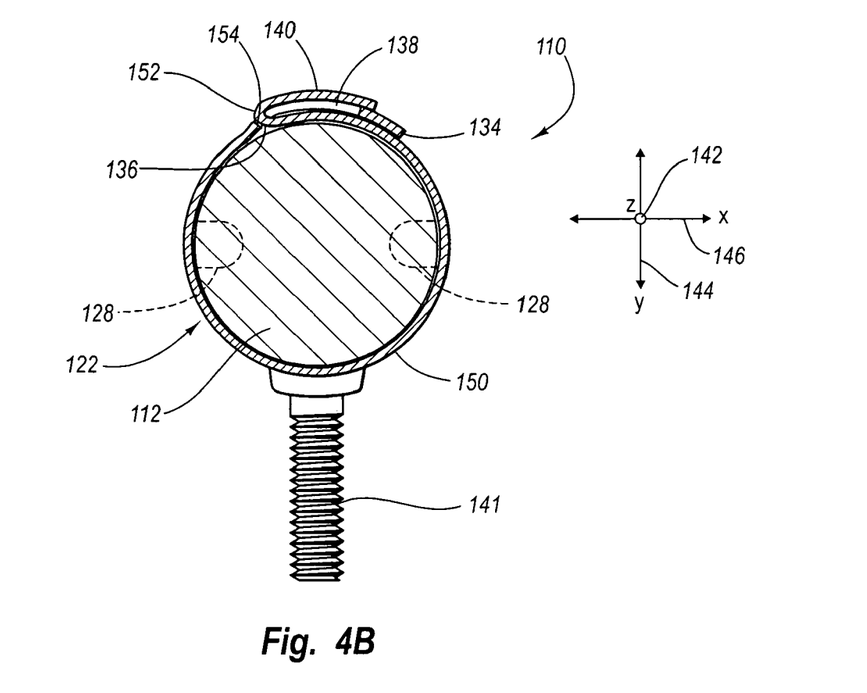
FIG. 4B is a front cross-sectional view of the inflator diffuser housing taken from the line 4B-4B of FIG. 3 encasing the airbag inflator.

Referring to FIG. 4B, the inflator diffuser housing 110 of FIG. 3 is illustrated from a front cross-sectional view along the plane 4B-4B as it houses an airbag inflator 112. Each engagement tab 140 located on the second longitudinal edge 136 is folded back over the perforation 138 it projects through toward the first longitudinal edge 134. The engagement tab 140 thereby forms a hook-like structure so that the engagement tab 140 can engage the perforation 138. As mentioned previously, the engagement tabs 140 may be formed into different shapes to engage their corresponding perforations 138. Consequently, the first longitudinal edge 134 is engaged with the second longitudinal edge 136. The combination of the engagement tabs 140 being engaged with their corresponding perforations 138 creates a structural stop to limit the ability of the longitudinal edges 134, 136 to become disengaged and no longer overlap each other.

When the engagement tabs 140 are folded toward the first longitudinal edge 134, they form a crease 152. The crease 152 is positioned to abut or be in proximity to the inward edge 154 of the perforation 138. The perforations 138 are thereby covered by the second longitudinal edge 136 of the sleeve 122. The engagement tabs 140 and perforations 138 thus oriented provide for a tight press fit for the airbag inflator 112.

The diffuser housing 110 encasing the inflator 112 occupies substantially the same amount of space as the inflator 112 alone. The inflator's 112 diameter is minimally increased by including the diffuser housing 110. Preferably, the diameter of the inflator diffuser system in the direction of the x-axis 146 is the diameter of the inflator 112 plus two times the thickness of the sleeve wall 150. Generally, the sleeve wall 150 has a thickness of about 0.030", increasing the inflator 112 diameter only 0.060" by placing it in the diffuser housing 110.

The diameter of the inflator 112 and the sleeve 122 in the direction of the y-axis 144 is at most the diameter of the inflator 112 plus four times the thickness of the sleeve wall 150. However, an increase in the dimension of the inflator 112 in the direction of the y-axis 144 is not as critical since it already contains the orthogonally projecting mounting studs 141 in that dimension. Maintaining a small dimension of the inflator 112 in the direction of the x-axis 146 is important to maintaining a thin profile of the airbag system.

Prior to activation, the diffuser housing 110 occupies substantially the same amount of space in the direction of the x-axis 146 as does the inflator 112 alone. This space savings may result in a significantly smaller installation space as compared to conventional airbag systems. The aesthetic appeal of the installation location within a motor vehicle is improved.

Figure 4C:
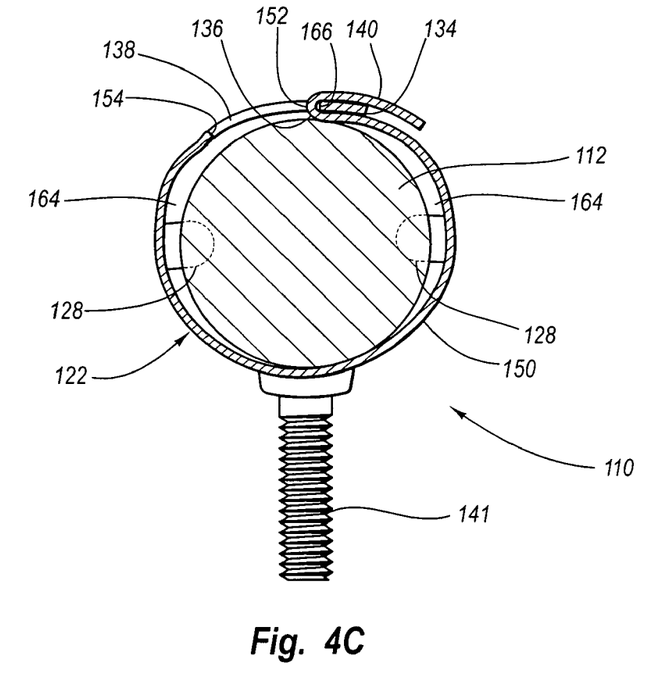
FIG. 4C is a front cross-sectional view of the inflator diffuser housing taken from the plane 4C-4C of FIG. 2B after activation of the airbag inflator and expansion of the diffuser housing.

Referring to FIG. 4C, the inflator diffuser housing 110 of FIG. 2B is illustrated from a front cross-sectional view along the plane 4C-4C encasing an airbag inflator 112. The diffuser housing 110 is shown after it has expanded radially under pressure of impinging exhaust gas (not shown) from the activated inflator 112. When exhaust gas exerts a force against the sleeve wall 150 the first longitudinal edge 134 slides with respect to the second longitudinal edge 136, such that the longitudinal edges 134, 136 are closer to one another. An exhaust passage 164 is thereby formed within the diffuser housing 110 between the sleeve 122 and the airbag inflator 112. The exhaust passage 164 is the space created between the inflator 112 and the sleeve wall 150. Exhaust gas leaving the inflator 112 may travel through the newly formed exhaust passages 164 to an area exterior to the diffuser housing 110.

When the sleeve 122 expands radially, the crease 152 of each engagement tab 140 moves from a position adjacent the inward edge 154 of the perforation 138 to engagement with the outward edge 166 of the perforation 138. The perforation 138 becomes exposed to the exterior of the diffuser housing 110 to allow exhaust gas to flow there through. The engagement of the folded engagement tab 140 with the outward edge 166 of the perforation 138 functions as a structural stop to limit the radial expansion of the sleeve 122.

Without the structural stop, radial expansion of the sleeve 122 would continue under the force of impinging exhaust gas until the longitudinal edges 134, 136 become completely separated exposing the inflator 112 to the airbag (not shown). When the engagement tab 140 engages the outward edge 166 of the perforation 138, radial expansion ceases.

Figure 5:
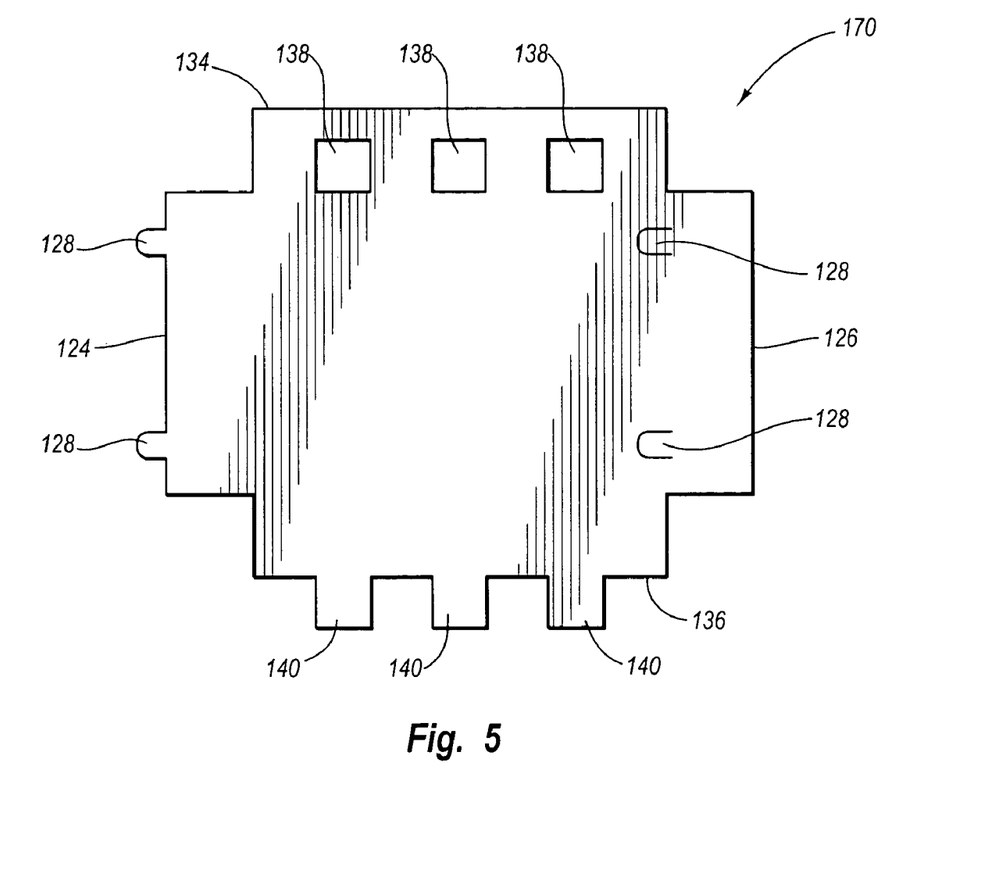
FIG. 5 is a top plan view of a stamped metal sheet used to construct the inflator diffuser housing of FIG. 2A.

Referring to FIG. 5, a stamped metal sheet 170 used to construct the inflator diffuser housing 110 of FIG. 2A is depicted from a top plan view. The use of a metal stamping process can produce high strength airbag module components at low cost. The stamped metal sheet 170 is formed from a rectangular blank of sheet metal. Alternatively, other metallic or non-metallic materials may be used to form the diffuser housing 110 including, but not limited to, copper, aluminum, various resins and the like.

To create the stamped metal sheet 170, the blank is placed over a form or die (not shown). The blank is then stamped into the form, forcing the sheet to take the shape of the form. In a single-step process the blank is cut so that perforations 138 are formed in the stamped metal sheet 170 adjacent the first longitudinal edge 134. Engagement tabs 140 are simultaneously formed in the second longitudinal edge 136 opposite each perforation 138. Also formed in the stamped metal sheet 170 are crimping tabs 128. Crimping tabs 128 may be formed in the edge of the stamped metal sheet 170 that will become the proximal end 124 of the diffuser housing 110. Partially cut-out portions also form crimping tabs 128 near the edge of the stamped metal sheet 170 that will become the distal end 126 of the diffuser housing 110.

The stamped metal sheet 170 is then rolled to form a substantially tubular or cylindrical shape. This may be accomplished through the use of a rolling press (not shown). Once rolled, the first longitudinal edge 134 overlaps the second longitudinal edge 136 to form the sleeve 122. The diameter of the sleeve 122 is substantially the same as that of the inflator (not shown), or the diameter of the sleeve 122 could be smaller than the inflator to provide for a tight press fit.

Referring generally to FIGS. 1-5, the present invention provides an airbag diffuser housing 10, 110 that is simple to fabricate. The diffuser housing 10, 110 of the present invention may be installed in a much smaller space than conventional inflator systems because the exhaust passage 164 is not yet formed until the inflator 12, 112 is activated. The diffuser housing 10, 110 diffuses and cools the exhaust gas 162 to prevent damage to the airbag (not shown).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag inflator diffusion system, comprising:
   an airbag inflator having an exhaust gas exit port;
   a sleeve having a longitudinal axis and shaped to receive the inflator securely within the sleeve, the sleeve expanding radially under a force of impinging exhaust gas, the sleeve comprising a structural stop to limit the radial expansion of the sleeve; and
   at least two crimped tabs being added to a proximal end of the sleeve and at least two crimped tabs being added to a distal end of the sleeve, wherein the crimped tabs are folded inward to hold the inflator within the sleeve during deployment, wherein when the crimped tabs are folded inwards, the tabs are substantially perpendicular to the longitudinal axis of the sleeve, and wherein when the sleeve expands radially under the force of the impinging gas, the crimped tabs moves radially outwardly away from each other.

2. The inflator diffusion system of claim 1, wherein the structural stop comprises a tab and a perforation, such that the tab is shaped to engage the perforation upon radial expansion of the sleeve to limit expansion.

3. The inflator diffusion system of claim 1, wherein the structural stop comprises a hook and a perforation, such that the hook engages the perforation upon radial expansion of the sleeve to limit expansion.

4. The inflator diffusion system of claim 1, wherein a first longitudinal edge of the sleeve overlaps a second longitudinal edge along a length of the sleeve.

5. The inflator diffusion system of claim 4, wherein the first longitudinal edge is slidably movable with respect to the second longitudinal edge under the force of impinging exhaust gas.

6. The inflator diffusion system of claim 1, wherein a perforation in the sleeve becomes exposed upon radial expansion of the sleeve.

7. The inflator diffusion system of claim 6, wherein the perforation is positioned to allow exhaust gas to flow out of the sleeve through the perforation and into an inflatable cushion.

8. The inflator diffusion system of claim 6, wherein the perforation overlays a portion of the inflator excluding the exit port.

9. The inflator diffusion system of claim 1, wherein the inflator is an elongate inflator and the sleeve extends a length of the elongate inflator.

10. The inflator diffusion system of claim 1, wherein the structural stop allows the sleeve to expand radially a predetermined amount.

11. The inflator diffusion system of claim 1, wherein the radial expansion of the sleeve forms an exhaust passage between the sleeve and the inflator.

12. The inflator diffusion system of claim 11, wherein the sleeve comprises a solid section positioned to receive direct impingement of the exhaust gas from the exit port and direct the exhaust gas through the exhaust passage.

13. The inflator diffusion system of claim 1, wherein a cross-sectional shape of the sleeve is substantially the same as a cross-sectional shape of the inflator.

14. The inflator diffusion system of claim 1. wherein the sleeve has a mounting stud extending orthogonally therefrom.

15. An airbag inflator diffuser, comprising:
   a sleeve having a longitudinal axis and having a first longitudinal edge that overlaps a second longitudinal edge along a length of the sleeve, the sleeve expanding radially under a force of impinging exhaust gas from an exit port of an inflator when installed within the sleeve;
   a structural stop to limit the radial expansion of the sleeve; and
   at least two crimped tabs being added to a proximal end of the sleeve and at least two crimped tabs being added to a distal end of the sleeve, wherein the crimped tabs are folded inward to hold the inflator within the sleeve during deployment, wherein when the crimped tabs are folded inwards, the tabs are substantially perpendicular to the longitudinal axis of the sleeve, and wherein when the sleeve expands radially under the force of the impinging gas, the crimped tabs move radially outwardly away from each other.

16. The diffuser of claim 15, wherein the structural stop allows the sleeve to expand radially a predetermined amount.

17. The diffuser of claim 16, wherein the structural stop comprises a tab and a perforation in the sleeve, such that the tab is shaped to engage the perforation upon radial expansion of the sleeve to limit expansion.

18. The diffuser of claim 17, wherein the perforation is adjacent the first longitudinal edge and the tab is adjacent the second longitudinal edge.

19. The diffuser of claim 18, wherein the first longitudinal edge is slidably movable with respect to the second longitudinal edge under the force of impinging exhaust gas.

20. The diffuser of claim 19, wherein the perforation becomes exposed upon radial expansion of the sleeve.

21. The diffuser of claim 20, wherein the perforation is positioned to allow exhaust gas to flow out of the sleeve through the perforation and into an inflatable cushion.

22. The diffuser of claim 21, wherein the perforation overlays a portion of the inflator excluding the exit port.

23. The diffuser of claim 22, wherein the radial expansion of the sleeve form an exhaust passage between the sleeve and the inflator.

24. The diffuser of claim 23, wherein the sleeve comprises a solid section positioned to receive direct impingement of the exhaust gas from the exit port and direct the exhaust gas through the exhaust passage.

25. The diffuser of claim 16, wherein the structural stop comprises a hook and a perforation in the sleeve, such that the hook engages the perforation upon radial expansion of the sleeve to limit the expansion.

26. The diffuser of claim 16, wherein the sleeve is shaped to extend a length of an elongate inflator.

27. The diffuser of claim 26, wherein a cross-sectional shape of the sleeve is substantially the same as a cross-sectional shape of the inflator.

28. The diffuser of claim 15, wherein the sleeve has a mounting stud extending orthogonally therefrom.

29. An airbag inflator diffusion system, comprising:

an airbag inflator having an exhaust gas exit port;

a sleeve having a longitudinal axis and having a first longitudinal edge that overlaps a second longitudinal edge along a length of the sleeve, the sleeve expanding radially to form an exhaust passage under a force of impinging exhaust gas from the exit port of the inflator installed within the sleeve, the sleeve having a perforation adjacent the first longitudinal edge and a tab adjacent the second longitudinal edge, such that the tab is shaped to engage the perforation upon radial expansion of the sleeve to limit expansion; and at least two crimped tabs being added to a proximal end of the sleeve and at least two crimped tabs being added to a distal end of the sleeve, wherein the crimped tabs are folded inward to hold the inflator within the sleeve during deployment, wherein when the crimped tabs are folded inwards, the tabs are substantially perpendicular to the longitudinal axis of the sleeve, and wherein when the sleeve expands radially under the force of the impinging gas, the crimped tabs move radially outwardly away from each other.

* * * * *

UNITED STATES PATENT AND TRADEMARK OFFICE
CERTIFICATE OF CORRECTION

PATENT NO. : 7,370,884 B2 Page 1 of 1
APPLICATION NO. : 10/791399
DATED : May 13, 2008
INVENTOR(S) : Marcus T. Clark et al.

It is certified that error appears in the above-identified patent and that said Letters Patent is hereby corrected as shown below:

In column 11, line 66, please replace "crimped tabs moves radially" with --crimped tabs move radially--

In column 13, line 19, please replace "the sleeve form an exhaust passage" with --the sleeve forms an exhaust passage--

Signed and Sealed this

Twelfth Day of August, 2008

JON W. DUDAS
*Director of the United States Patent and Trademark Office*